US007373338B2

(12) United States Patent
Thompson et al.

(10) Patent No.: US 7,373,338 B2
(45) Date of Patent: May 13, 2008

(54) ACCESS CONTROL TO SHARED RESOURCES

(75) Inventors: Simon G. Thompson, Ipswich (GB); Zhu Tan, Ipswich (GB); Yang Li, Ipswich (GB); Nick Giles, Ipswich (GB)

(73) Assignee: British Telecommunications public limited company, London (GB)

( * ) Notice: Subject to any disclaimer, the term of this patent is extended or adjusted under 35 U.S.C. 154(b) by 523 days.

(21) Appl. No.: 10/784,919

(22) Filed: Feb. 24, 2004

(65) Prior Publication Data

US 2004/0243633 A1 Dec. 2, 2004

(30) Foreign Application Priority Data

Mar. 18, 2003 (GB) .................................. 0306193.4
Sep. 3, 2003 (GB) .................................. 0322869.9

(51) Int. Cl.
*G06F 7/00* (2006.01)
(52) U.S. Cl. ............................................... 707/3; 707/5
(58) Field of Classification Search .............. 707/1–10, 707/101; 705/8, 10, 14
See application file for complete search history.

(56) References Cited

U.S. PATENT DOCUMENTS

| 6,374,290 | B1 * | 4/2002 | Scharber et al. ............ 709/205 |
| 6,513,033 | B1 * | 1/2003 | Trauring ........................ 707/3 |
| 6,636,886 | B1 * | 10/2003 | Katiyar et al. .............. 709/203 |
| 6,741,967 | B1 * | 5/2004 | Wu et al. ..................... 705/10 |
| 6,741,986 | B2 * | 5/2004 | Cho et al. ...................... 707/5 |

(Continued)

FOREIGN PATENT DOCUMENTS

JP    2001-117823    4/2001

(Continued)

OTHER PUBLICATIONS

Farquhar et al, "The Ontolingua Server: a Tool for Collaborative Ontology Construction", published in the *Proceedings of the Tenth Knowledge Acquisition for Knowledge-Based Systems Workshop*, (Banff. Canada; Nov. 9-14, 1996).

(Continued)

*Primary Examiner*—Wilson Lee
(74) *Attorney, Agent, or Firm*—Nixon & Vanderhye P.C.

(57) ABSTRACT

Controlled access is provided to a shared resource 23 such as an ontology (knowledge database) in order to maintain its quality without restraining the ability of users 21*a*, 21*b*, 21*c* . . . to contribute to that resource.

An edit and query function 26 is used to determine the validity and consistency of individual contributions. The results of these checks and the level of contribution made by individual users to the information resource is used to produce a rating for each user of the resource, which is stored (24*a*, 24*b* . . . ) for use in prioritise and manage future contributions to the resource 23, provide metadata on the resource and to prioritise access control 28 to the resource.

When a new contribution is made by a user a threshold of approval can be set before it is accepted into the main database 23. This threshold is based on the sum of the ratings points of the original contributor and of users that give their assent to the inclusion of that contribution.

19 Claims, 4 Drawing Sheets

U.S. PATENT DOCUMENTS

| | | | |
|---|---|---|---|
| 6,804,345 B1* | 10/2004 | Bala et al. | 379/265.04 |
| 7,092,821 B2* | 8/2006 | Mizrahi et al. | 702/1 |
| 2002/0120609 A1* | 8/2002 | Lang et al. | 707/1 |
| 2002/0184098 A1* | 12/2002 | Giraud et al. | 705/14 |
| 2003/0167195 A1* | 9/2003 | Fernandes et al. | 705/8 |

FOREIGN PATENT DOCUMENTS

| | | |
|---|---|---|
| JP | 2002-117215 | 4/2002 |
| WO | WO 01/22299 A1 | 3/2001 |
| WO | WO 02/077904 A2 | 10/2002 |
| WO | WO 02/080028 A1 | 10/2002 |

OTHER PUBLICATIONS

Narayanan, "Knowledge Based Action Representations for Metaphor and Aspect (Karma)" PhD Thesis Computer Science Division WECS Department University of California at Berkeley 1997.

* cited by examiner

ACCESS CONTROL TO SHARED RESOURCES

TECHNICAL FIELD

The invention relates to the control of access to shared resources, and in particular to the management of ontologies used in navigating such resources. In order that information from different sources can be integrated, it is necessary to agree on a common set of definitions, terminology and classification systems. Such a set is known as an ontology. Such ontologies provide the basis under which technical standards, and bibliographical and similar classification systems are generated.

BACKGROUND

It is important that the relationships between parts of the ontology are defined and applied consistently. However, the ontology must also be adaptable if it is to remain useable as circumstances change. For instance, new technical developments, or commercial or regulatory requirements, may require modification of a technical standard, or the definition of new relationships between its elements. For example, a mobile telephony standard originally developed to ensure interopability between handsets and fixed network components will require considerable adapation if a new requirement is introduced requiring a first network to support handsets of subscribers of a second network. In another example, classification systems for technical literature such as patents have to be kept abreast of developments in the technologies that are the subject of the classification, and this involves considerable workload to co-ordinate the behaviour of all the users of the classification system, from reporting of the need for such changes through to their consistent implementation.

There is a difficult balance to be struck between on the one hand keeping an ontology internally consistent, which is best met by maintaining a tight change-control system, administered by a small group of people, and on the other hand maintaining the ontology's usefulness by allowing any user who has an interest to initiate changes. The result is generally that any proposals for change have to be submitted to a slow and cumbersome committee process, considerably delaying the introduction of any proposal.

Ontology servers exist which provide a facility to share vocabularies and versioning systems between a number of users who have access to a set of data resources. Such ontology resources provide information on data schema and relationships between data schema.

A mechanism for collaboratively developing ontologies is specified by Farquhar, A.; Fikes. R.; & Rice, J. in an article "*The Ontolingua Server: a Tool for Collaborative Ontology Construction*"; published in the *Proceedings of the Tenth Knowledge Acquisition for Knowledge-Based Systems Workshop*; (Banff, Canada; Nov. 9-14, 1996). This provides tools that make use of the world-wide web to enable wide access and provide users with the ability to publish, browse, create, and edit ontologies stored on an ontology server. An individual user can therefore assemble a new ontology from a library of modules. However, there would be problems of consistency and validity of the ontology if a number of users were to attempt to collaborate in order to generate a common ontology that they can all use. If every user were given complete freedom to amend the common ontology, inexperienced or inconsiderate users might make changes which would cause considerable detriment to the usefulness of the ontology to the other users. If the reliability of the inputs is unknown, contradictory information or contradictory results of inference cannot be evaluated against each other. Therefore some moderation of the process is required. However, no individual human user, or group of such individuals, can be expected to have a full understanding of the needs of all the other users of the ontology, especially in a user group that is open to any user wishing to make use of it. A consultation process with all users, such as that proposed by Farquhar, Fikes, and Rice, delays implementation of any changes required, and would be very difficult to arrange, especially in the context of a real business environment, except with a closed community of relatively small size. There is therefore a need to control access to a shared data resource in order to maintain its quality without restraining the ability of users to contribute to that resource.

SUMMARY

The present invention applies a system of access control to allow the collaborative development of an ontology service.

Community-managed information sources are well known. For example "Slashdot" is a community driven log for computer related material. Stories are submitted by users, and users are invited to comment on the stories published, providing supplemental material. The comments themselves are rated by other users. Providing comment earns the user "karma" points, and the number of points that a user gains is related to how highly the story is rated. Comments can be negatively rated, in which case the user may lose points. For example an abusive comment will tend to be negatively rated by the community. Users with high karma are able to submit comments with a high initial rating, this means that "good" users have a stronger voice on the site than "bad" users.

According to the invention, there is provided apparatus for generating and maintaining a data resource, comprising a repository for the data resource, access means for allowing a plurality of users to amend the data resource, moderation means for recording amendments made to the resource and moderation inputs relating to such amendments, and rating means for generating and storing a moderation value for each amendment, the moderation value being determined by such moderation inputs.

The apparatus may include moderation inputs from a number of sources. Firstly there may be means for providing inputs generated by the users, assessing the validity, usefulness and other qualities of the amendments made by other users.

A second moderation input may be provided from an amendment moderation value generation means, comprising means for checking the effect of the amendments made, to determine the validity and consistency of the amendments, and means for generating a moderation input from the results of such checking. For example a new assertion may be checked to determine whether it is consistent with the existing ontology.

A third moderation input may be provided by means for generating a user moderation value for each user of the system in respect of inputs made by that user; a user moderation value store arranged to store the user moderation values, and means for retrieval of user moderation values from the user moderation value store. The user moderation values may be based on the results of the checks already referred to, and also the level of contribution of the users to the information resource, to produce a user moderation value or rating for the user of the source.

A quality rating may be stored for each resource, the rating means retrieving the quality rating for a modified resource and generating moderation values in accordance with the retrieved quality rating. The quality rating for each resource may be generated in accordance with the number of reference links referring to the resource The level of contribution may be defined by factors such as the number and rating of previous assertions made, number of ontologies defined and imported, number of concepts defined, and the number of comments made on other user's proposals). This user moderation value rating can then be used to prioritise and manage future contributions to the resource, provide metadata on the resource and to prioritise access to the resource.

The apparatus may include amendment storage means, for storing amendment proposals prior to implementation, means for receiving quality values relating to the amendment proposals, and means for amending the data resource in accordance with the amendment proposal when the quality values pass a predetermined upper threshold. There may also be means for deleting amendment proposals for which the quality values pass below a lower threshold, or which have failed to pass the upper threshold within a predetermined period.

Thus, when an assertion is proposed for incorporation in the ontology, a threshold of approval can be set before it is accepted into the main ontology. This threshold is based on the sum of the moderation values associated with users that give their assent, thus the opinion of a user with a higher moderation value will have a greater influence than one with a lower moderation value. The threshold can be determined by a formula based on the sums of the moderation values of the users who have ownership and access to the ontology concerned. Users who actively dissent would cause the approval rating to move towards the lower threshold, again in proportion to the user's moderation value. The initial value of the quality value may be set according to the moderation value of the user initiating the amendment proposal.

In a preferred embodiment, the retraction of a addition to the knowledge stored in the system should have a higher threshold for success than the addition of knowledge. This is because other assertions may be dependent on the retracted element; therefore the cost of checking for these dependencies may be higher, and the retraction may cause a ripple effect in the knowledge base.

Determining the integrity, origin, and quality of resources is an important part of deciding on how they are to be used. By using this invention meaningful mark-up of this type can be maintained.

According to another aspect of the invention, there is provided a method of generating and maintaining a data resource, by recording amendments made to the resource, generating moderation inputs relating to such amendments, and generating a moderation value for each amendment, the moderation value being determined by the said moderation inputs.

The invention also extends to a computer program product or suite of such products for use with one or more computers to carry out this method. The computer program product may be embodied on any suitable carrier, readable by a suitable computer input device. Such carriers include punched card or tape, CD-ROMs, optically readable marks or magnetic media carried on a suitable substrate, or an electromagnetic, optical or acoustic signal.

BRIEF DESCRIPTION OF THE DRAWINGS

An embodiment of the invention will now be further described, by way of example only, with reference to the drawings, in which.

DETAILED DESCRIPTION

Figure 1:
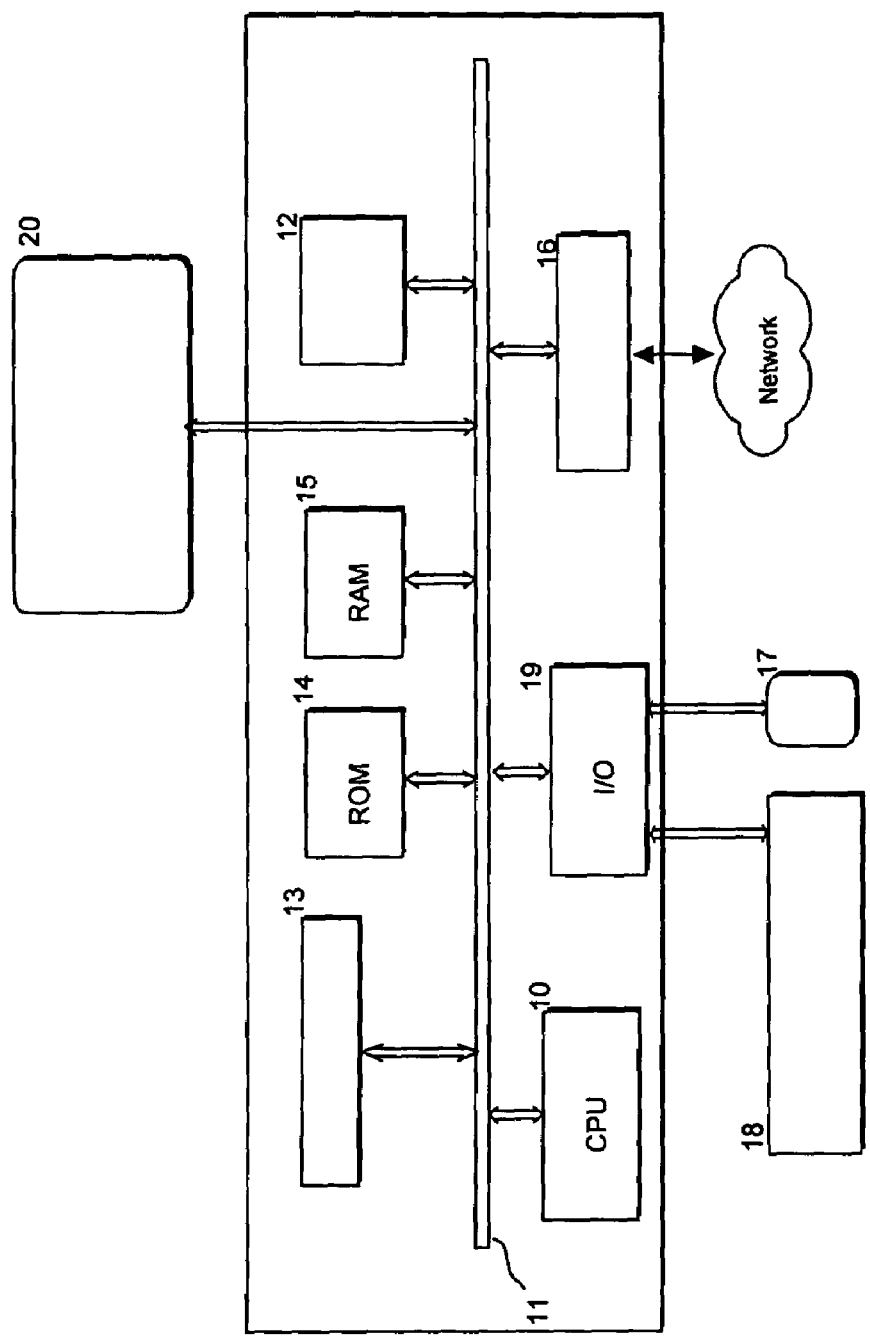
FIG. 1 shows a typical architecture for a computer on which the invention may be run.

A typical architecture for a computer on which software implementing the invention can be run, is shown in FIG. 1. The computer comprises a central processing unit (CPU) 10 for executing computer programs and managing and controlling the operation of the computer. The CPU 10 is connected to a number of devices via a bus 11, the devices including a first storage device 12, for example a hard disk drive for storing system and application software, a second storage device 13 such as a floppy disk drive or CD/DVD drive for reading data from and/or writing data to a removable storage medium and memory devices including ROM 14 and RAM 15. The computer further includes a network card 16 for interfacing to a network. The computer can also include user input/output devices such as a mouse 17 and keyboard 18 connected to the bus 11 via an input/output port 19, as well as a display 20. It will be understood by the skilled person that the above described architecture is not limiting, but is merely an example of a typical computer architecture. In particular, it will be understood that the computing resource may be distributed, such that a user may access a memory stored on a first computer (for example a server) using an input/output device of a second computer, connected to the first computer through respective network connections 16. It will be further understood that the described computer has all the necessary operating system and application software to enable it to fulfil its purpose.

It should be understood that the invention is intended for implementation by the co-operation of several users, who may all use the same computer at different times, but are more likely to be using separate computers interconnected through a network. Intermediate arrangements, such as several terminals each having their own input/output devices (17,18,19,20) connected to a single CPU 10, are also possible.

Figure 2:
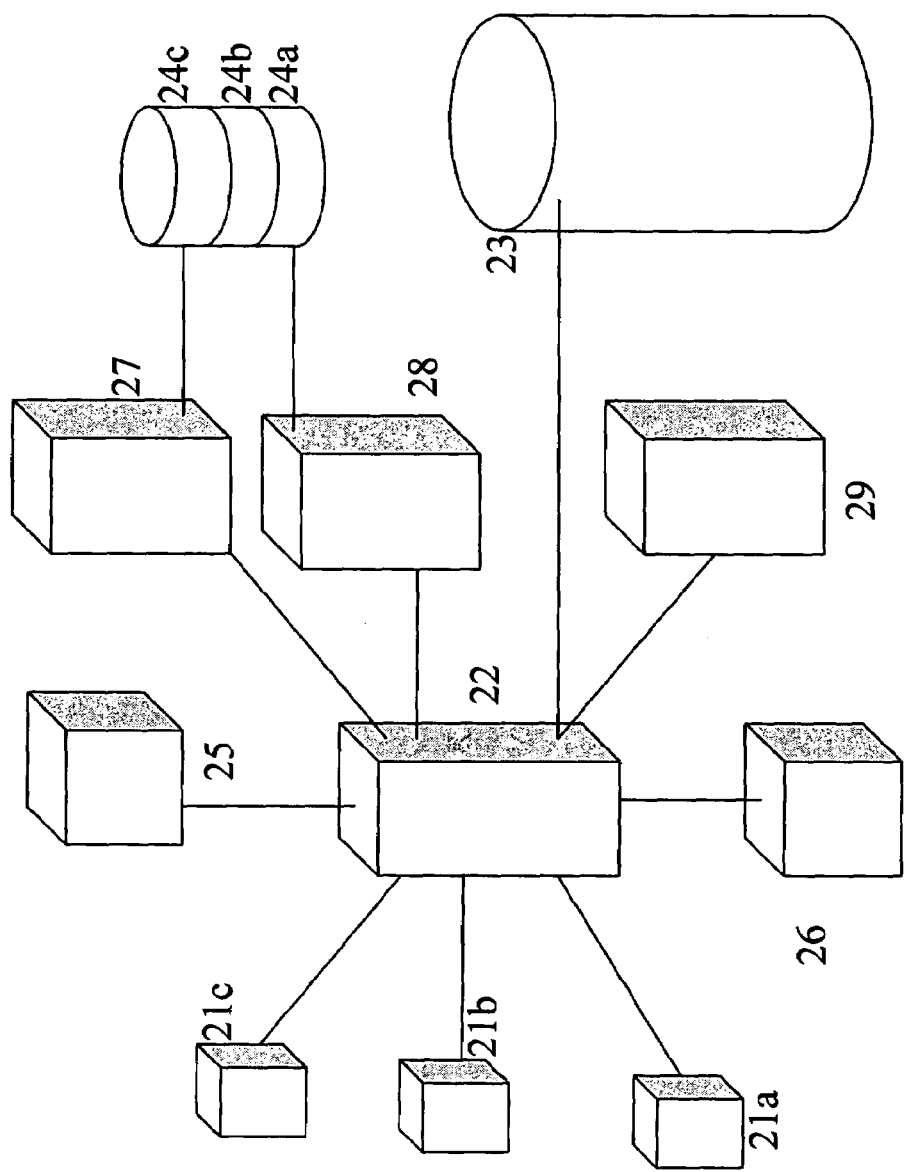
FIG. 2 is an organisation diagram illustrating the various functional elements which co-operate in the invention

FIG. 2 illustrates the relationships between the various functional elements making up this embodiment of the invention. Each user is associated with a respective client agent 21a, 21b, 21c . . . . Each client 21a, 21b, 21c . . . has a respective user profile 24a, 24b, 24c . . . accessible through the server 22.

The client agents allow the user to access a repository 23 of ontology resources by way of a server agent 22. In particular, an import function 25 is provided to add new resources, and an edit and query function 26. A user profile server 27 controls access to the rest of the system, and a user profile update facility 28 is provided to maintain the individual user profiles 24a, 24b, 24c etc. A retrieval function 29 is provided to allow retrieval of ontology resources from the repository 23.

Figure 3:
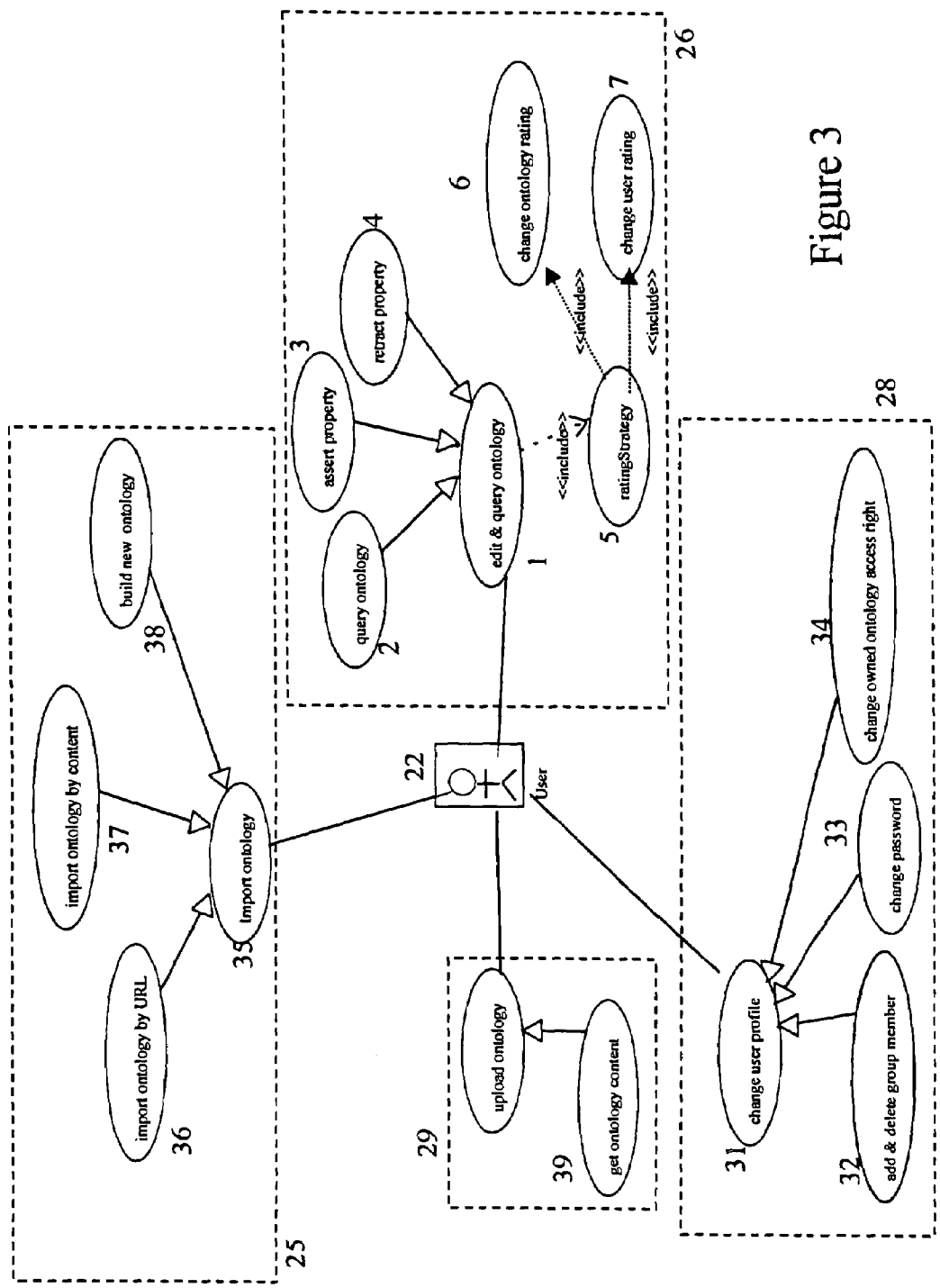
FIG. 3 is an organisation diagram illustrating the various operations available to an individual user of the embodiment of the invention

FIG. 3 illustrates four basic functions available to users of this embodiment of the invention, each of which has a number of subsidiary functions. These functions will generally be run in software on a general purpose computer such as that illustrated in FIG. 1, to which other users have access over respective network connections 16 through the client/server interface 21/22.

An ontology creation process (35,36,37,38) for the addition of new or imported ontologies is run by the import functionality 25. There is the moderation process itself (1,2,3,4,5,6,7), which is run by the edit and query function 26 and which is the subject of this invention. Thirdly there is a function for the maintenance of the user profile server (31,32,33,34), performed by the user profile server 28. There is also an ontology accession function 39, run by the retrieval function 29. These are all accessed through the client/server connection 21,22, and will be discussed in turn.

An account management system 31 is used for the maintenance of user profiles, using an access control list. Such lists are commonly known: for example the UNIX system implements a "Owner/Group/Others" control policy in which the owner has one set of rights (for example read/write access), the group another set, (generally more limited, for example read-only), and the "others" another set (which may be a null set). In order to implement the invention there is a need for users to belong to a number of different groups simultaneously, for example a user group for a first ontology and an updater group for a second ontology. It is also desirable that users can create a resource and then create an access control policy that specifies who in the system is able to access the resource, including the creation of new groups of users, and the specification that certain pre-existing groups should have access. This requires the assignment of users to a particular group without their knowledge. For this purpose an account management system 31 provides a user maintenance process 32 to allow the creation of a user identity, an access right allocation system 33 to assign each user to the appropriate user groups, and an access control system 34 to provide the user with permissions to access specified ontology and knowledge resources.

The ontology creation system 35 allows a user to add an ontology to the system. In this embodiment three subsystems are provided. A link creation processor 36 provides means for generating a "hyperlink" to an Internet address where the ontology is already available. A copying processor 37 allows the copying of the ontology itself to the computer memory. Finally, provision is also made for the creation of a new ontology 38.

An ontology imported by citing a hyperlink will be accessible to a user over the "Internet" in well-known manner. Each ontology imported using either of the processes 37, 38 will generally be stored in a memory of a serving computer, also accessible using the user's network connection 16. Each ontology added to the database by any of these methods is owned by an individual user, (usually the user who added it to the system). The owning user can set permissions to define the group of users who can access it.

The ontology accession system 39 allows users having the necessary permissions to access a copy of an individual ontology.

The moderation process 1,2,3,4,5,6,7 will now be described, firstly with reference to FIG. 2.

Each ontology resource is allocated a quality value and each user is allocated a moderation value. These have a predetermined initial value, but can change during the moderation process. Any user may generate a query 2 relating to the ontology, or an assertion 3 of a property to be included in the ontology, or a retraction 4 of an existing property. Such changes are stored, together with a quality value derived in part form the user's moderation value, as will be discussed later. Other users may then assess the proposed change, using the rating strategy process 5. This process, to be described in detail shortly, activates a change function 6 in the quality rating of the ontology under consideration, and a change function 7 in the moderation rating of the user who carries out the rating. It may also influence the rating of the maker of the assertion, retraction or other change.

The initial quality value of a resource may depend on intrinsic properties of that resource, such as the number of elements (assertions) it has. This may be adjusted by a factor dependant on the moderation value of the user who proposed it—this will allow more rapid acceptance of resources supplied by the users who have provided the best inputs historically. The quality value may be incremented for each accepted assertion added, (as this increases its potential usefulness) and for every query answered on the ontology (as this is an indicator that the resource is in fact being used)

In addition the rating of a resource may be calculated by searching for references or dependencies to that resource from other resources. In this way the significance of the resource to the body of knowledge is used to indicate its value.

In this case the means for calculating such dependencies should utilize efficient search algorithms, binary search is one such algorithm. Heuristic searches are another mechanism. In particular heuristic searches that prune the space of the search across the resource sets could be used. Such heuristics include:

Elimination of resources of certain types from the search; for example eliminate resources that do not contain a particular text string.

Inclusion of only resources that contain a particular text string.

Inclusion of resources that were added in particular date ranges.

Inclusion of resources that were accessed in particular date ranges.

Inclusion of resources that have been accessed or used a particular number of times.

These heuristics are dependent on the type and use of the resources in the knowledge base.

Figure 4:
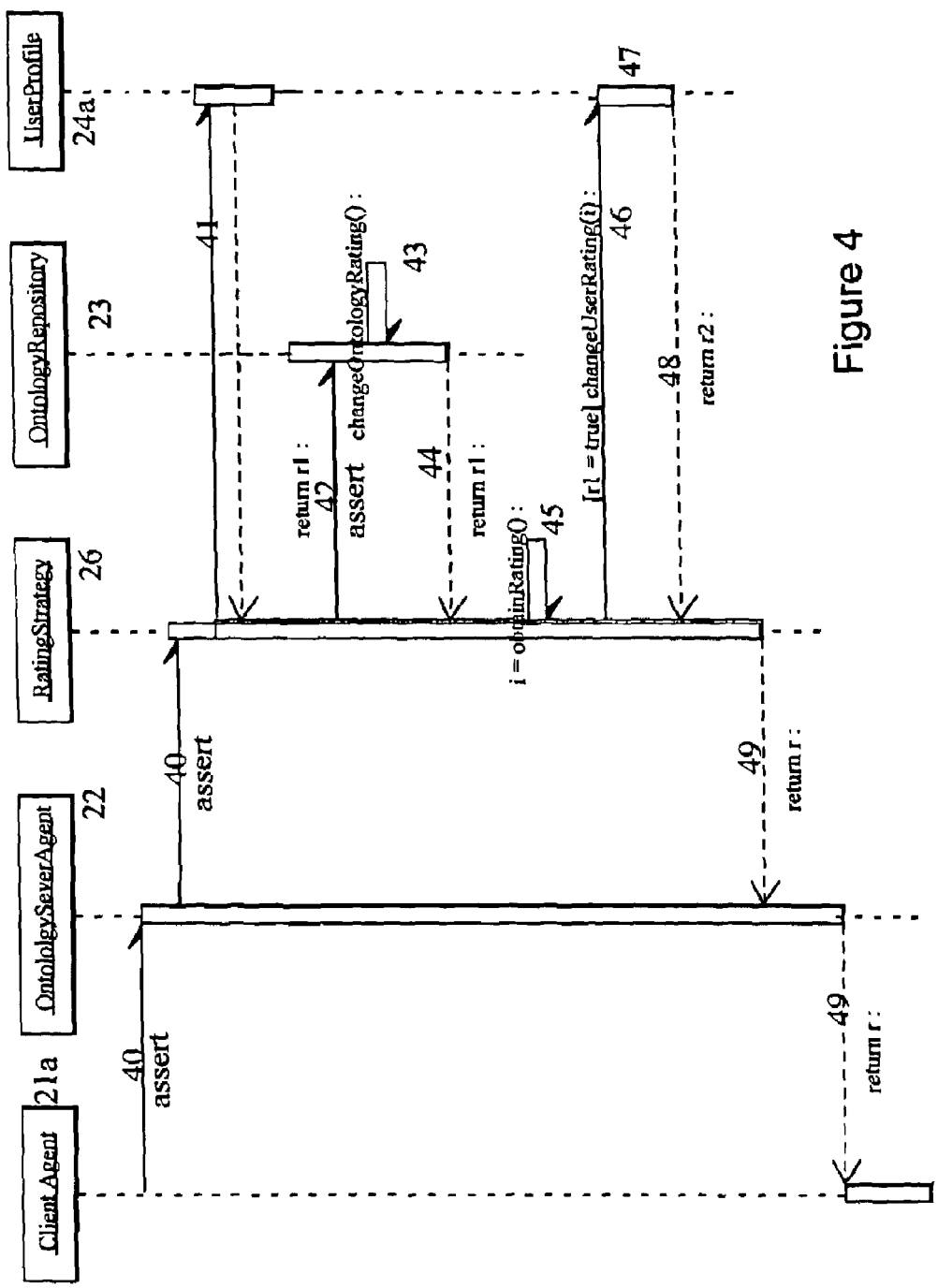
FIG. 4 is a message flow diagram illustrating the generation of a moderation input for an amendment proposal

The process of adding an assertion or a retraction relating to an existing resource, will now be described with reference to FIG. 4. The process of adding a new resource is similar in most respects.

The process starts when a user, through his respective client agent 21a, presents a proposed change of a resource (step 40). This may be the assertion, or retraction, of a property of an existing ontology, or it may be the introduction of a new ontology, using the import function 25. This proposal is passed by the server agent 22 to the edit and query function 26. The edit and query function 26 first refers to the user profile 24a, to determine whether the user has the necessary access rights to make the proposed change (step 41). These access rights may be determined according to the current moderation value for that user and the quality value of the ontology resource to be modified, such that valuable resources (having a high value) cannot be interfered with by unreliable users (having a low moderation value).

Assuming that the proposal passes the access check, the proposal is forwarded to the repository 23 (step 42). The repository 23 includes means for checking the internal validity of the ontology with the proposed change. If the change is valid—that is to say, the ontology is not rendered inconsistent by the change—the change is added and the quality value of the ontology resource stored in the repository is incremented (step 43). This increment reflects the assumed greater usefulness of the resource, reflected both in the assumed increase in detail or accuracy represented by the change, and in the interest of the users in the resource assumed from the user input. If the ontology resource is a new one an initial quality value is generated based on measurable properties of the resource such as its size and internal consistency.

The repository 23 returns a true/false indication 44 to the edit and query function 26, according to whether the proposed change is valid. The edit and query function 26 checks the effect of the amendment proposed, to determine the validity and consistency of the amendments, and generates a moderation input from the results of such checking. For example a new assertion may be checked to determine whether it is consistent with the existing ontology.

Thus a new proposition that A is a member of set B (represented as $A \in B$) may conflict with existing statements that A is a member of set B' ($A \in B'$), and that membership of B and B' is mutually exclusive ($B \cap B' = \emptyset$). Such a conflict would affect the moderation value applied to the modification. (in the example above, the new proposition would have been valid had it been linked to another proposition deleting or amending one of the two existing statements. For example in the context of a technical standard, a radio frequency A initially reserved for exclusive use by purpose B' may be made available for a different purpose B. This requires that it either be withdrawn from availability for use B', or that B' ceases to have exclusive use of it. In a real example, of course, these changes would have further consequences which would have to be checked in turn.

The checking of these consequences is dependent on the cost of the queries subclass (p,r) and sameclass (p,r) for elements of the resource set. By arranging the way in which the answers to these queries can be obtained to ensure that they are as computationally cheap as possible the cost of checking can be reduced. The mechanism used is to enumerate all the answers to these queries as resources are added, or periodically, or at times of low useage, and to use these enumerations to answer the queries noted above.

When a user adds an assertion, a threshold is calculated, for example

Th=((Resource Quality value/n)−User's Moderation Value)), where n is the number of elements already in the resource. The threshold value may be set higher for deletions from the ontology than it is set for additions.

The edit and query function next retrieves the quality rating of the resource from the repository 23 (step 45), and uses it to generate an incremental value 46 for the user's moderation rating in the user's profile 24. The incremental value will depend on a number of factors, including the quality value of the resource—an amendment to a high-quality value resource scoring a greater increment than one to a poorer quality resource.

When a user adds a resource, that user's moderation value stored in his user profile 24*a*, 24*b*, 24*c* . . . is incremented by a value according to the number of concepts in the ontology or knowledge base added. When a user adds an assertion which is accepted to an existing ontology the moderation value of that user is also incremented. In a preferred arrangement the increment is proportional to the quality value of the resource but inversely proportional to the user's current moderation value. This is intended to prevent individual users from repeatedly adding assertions to their own resources, thereby increasing their own moderation ratings.

If the proposed amendment is inconsistent with the existing ontology the user may be requested to amend it. Otherwise, it will be added to the amendment repository 23, but with a reduced quality value. This ensures that it will require more users to approve it than a proposed amendment for which no such problem has been noted.

(Note that the quality of the resource is measured after the amendment is made, so that the increment takes into account the amendment just made). If the validity indicator 44 is negative, a zero or negative increment 46 is applied to the user rating.

The user profile 24 generates a new value for the user's moderation rating (step 47) which is returned to the edit and query function 26 (step 48).

The user's new rating, and any consequential changes to access rights, are then returned to the client agent 21 with an indication as to whether the proposal has been accepted (step 49)

Several users may wish to access resources simultaneously. A priority queue of such accessions may be established to favour users who have made good contributions to the resource in the past.

When resource contention occurs, queries and assertions from users are placed into a priority queue. The queue could be constructed in a number of ways to reflect the priority of the users' requests. One example could be that users could be placed in the queue at different positions depending on the moderation value that they have. The total moderation value of all users in the queue could be summed and the average found to form a threshold. Users that have moderation values above the threshold could be placed half way up the queue, other users could be placed on to the end of the queue. This will have two effects. Firstly highly rated users will receive preferential access to resources, secondly in cases of collision and contention for updating resources highly rated users will tend to be more successful.

As will be understood by those skilled in the art, any or all of the software used to implement the invention can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. Apparatus for generating and maintaining a data resource, comprising:
    a repository for the data resource;
    access means for allowing a plurality of users to make amendments to the data resource;
    moderation means for recording said amendments, and for recording moderation inputs made by the users relating to such amendments;
    rating means for generating a moderation value for each amendment derived from the moderation inputs received from the moderation means and for storing the moderation values so generated in the repository;
    means for generating a user moderation value in respect of each user, from moderation inputs of other users made in respect of amendments made by the user; and means for applying their respective user moderation values to inputs made by each user.

2. Apparatus according to claim 1 comprising means for input of user-generated data, the data relating to the users' assessments of the quality of amendments made by other users.

3. Apparatus according to claim 1, comprising an amendment moderation value generation means, comprising means for determining the validity and consistency of amendments, and means for generating a moderation input from the results of such determination.

4. Apparatus according to claim 1, further comprising a user moderation value store arranged to store the user moderation values, and means for retrieval of user moderation values from the user moderation value store.

5. Apparatus according to claim 1, comprising means for storing a quality rating for each resource, and wherein the rating means retrieves the quality rating for a modified resource and generates moderation values in accordance with the retrieved quality rating.

6. Apparatus according to claim 5, comprising analysis means for identifying reference links between resources, and means for generating, for each resource, said quality rating in accordance with the number of the links referring to the resource.

7. Apparatus according to claim 1, further comprising amendment storage means for storing amendment proposals prior to implementation, means for receiving moderation inputs relating to the amendment proposals, and means for amending the data resource in accordance with an amendment proposal when the moderation value for that amendment proposal passes a predetermined upper threshold.

8. Apparatus according to claim 7, further comprising means for deleting amendment proposals for which the moderation values pass below a lower threshold, or which have failed to pass the upper threshold within a predetermined period.

9. A method of generating and maintaining a data resource, said method comprising:
   recording amendments made to the resource by a user, and retrieving said amendments by use of a data access means;
   receiving moderation inputs generated by one or more users relating to such amendments;
   generating a moderation value for each amendment, the moderation value being determined by said moderation inputs; and
   generating for each user a user moderation value derived from moderation inputs applied by other users made in respect of amendments made by the user, and
   applying to inputs made by each user, the respective user moderation value.

10. A method according to claim 9 wherein user-generated data is recorded, assessing qualities of amendments made by other users.

11. A method according to claim 9, wherein the validity and consistency of amendments are determined, and a moderation value is generated from the results of such determination.

12. A method according to claim 9, wherein the user moderation value is stored for subsequent retrieval.

13. A method according to claim 9, wherein a quality rating is stored for each resource, and wherein moderation values are generated in accordance with the retrieved quality rating.

14. A method according to claim 13, wherein reference links between resources are identified, and said quality rating for each resource is generated in accordance with the number of such links referring to the resource.

15. A method according to claim 9, wherein a quality value is generated relating to an amendment proposal, and the data resource is amended in accordance with the amendment proposal when the quality value passes a predetermined upper threshold.

16. A method according to claim 15, wherein the predetermined threshold is set at different values for additions to, and deletions from, the data resource.

17. A method according to claim 15, wherein amendment proposals for which the quality values pass below a lower threshold, or which have failed to pass the upper threshold within a predetermined period are deleted.

18. A computer tangible medium containing a computer program for execution by at least one computer to carry out the method of claim 9.

19. A computer tangible medium containing a computer program for execution by at least one computer to provide the apparatus of claim 1.

* * * * *